US 6,956,868 B2

(12) United States Patent
Qiao

(10) Patent No.: US 6,956,868 B2
(45) Date of Patent: Oct. 18, 2005

(54) LABELED OPTICAL BURST SWITCHING FOR IP-OVER-WDM INTEGRATION

(76) Inventor: Chunming Qiao, 85 Misty La., East Amherst, NY (US) 14051

( * ) Notice: Subject to any disclaimer, the term of this patent is extended or adjusted under 35 U.S.C. 154(b) by 562 days.

(21) Appl. No.: 09/817,471

(22) Filed: Mar. 26, 2001

(65) Prior Publication Data

US 2002/0109878 A1 Aug. 15, 2002

Related U.S. Application Data

(60) Provisional application No. 60/269,005, filed on Feb. 15, 2001.

(51) Int. Cl.⁷ .................................................. H04J 3/16
(52) U.S. Cl. ......................... 370/466; 370/474; 398/48
(58) Field of Search ............................... 398/43, 45, 48, 398/49, 50, 51, 66, 68, 79, 89; 370/217, 218, 222, 223, 389, 466, 467, 474; 359/115, 123, 124, 125, 126, 128, 136, 137, 138, 139

(56) References Cited

U.S. PATENT DOCUMENTS

| | | | |
|---|---|---|---|
| 5,920,412 A | | 7/1999 | Chang |
| 6,111,673 A | | 8/2000 | Chang et al. |
| 6,160,651 A | | 12/2000 | Chang et al. |
| 6,545,781 B1 | * | 4/2003 | Chang et al. .................. 398/51 |
| 6,628,617 B1 | * | 9/2003 | Karol et al. ................. 370/237 |
| 6,647,208 B1 | * | 11/2003 | Kirby .......................... 398/45 |

OTHER PUBLICATIONS

Just–Enough–Time (JET): A High Speed Protocol for Bursty Traffic in Optical Networks, Myungsik Yoo & Chunming Qiao, Department of Electrical and Computer Engineering, State University of New York at Buffalo, Buffalo, New York 14260, *IE'/LEOS Summer Topical Meeting*, Aug. 11–15, 1997.

A High Speed Protocol for Bursty Traffic in Optical Networks, Myungsik Yoo, Myoungki Jeong & Chunming Qiao, Department of Electrical and Computer Engineering, State University of New York at Buffalo, Buffalo, New York 14260, *SPIE Proc. All–Optical Comm. Systems*, Dallas, Nov. 1997.

Terabit Burst Switching, Jonathan S. Turner, Computer Science Dept., Washington University, St. Louis, MO 63130–4899, Dec. 18, 1997.

Terabit Burst Switching, Jonathan S. Turner, Computer Science Dept., Washington University, St. Louis, MO 63130–4899, *Journal of High Speed Networks*, 1999.

WDM Burst Switching for Petabit Data Networks, Jonathan S. Turner, Washington Unversity, St. Louis.

All–Optical Label Swapping Networks and Technologies, Daniel J. Blumenthal, *Senior Memeber, IEEE, Member, OSA*, Bengt–Erik Olsson, Giammarco Rossi, Timothy E. Dimmick, Luvanya Rau, Milan Masanovic, Olga Lavrova, *Student Member, IEEE*, Roopesh Doshi, Olivier Jerpagnon, John E. Bowers, *Fellow, IEEE*, Volkan Kaman, Larry A. Coldren, *Fellow, IEEE, Fellow, OSA*, and John Barton, *Journal of Lightwave Technology*, vol. 18, No. 12, Dec. 2000.

(Continued)

*Primary Examiner*—Bob A. Phunkulh

(57) ABSTRACT

An integrated architecture called LOBS using enhanced/extended MPLS as a control plane and OBS as a switching paradigm that avoids optical/electrical/optical conversion of data at intermediate nodes is proposed. The structure of a LOBS node and the AP interface between an edge LOBS node and protocol data unit devices such as electronic LSR's are proposed, so are the structure of a LOBS control packet, burst assembly/disassembly methods, methods for fault detection/localization and recovering from lost bursts, and LOBS specific information for distribution using extended IGP protocols for traffic engineering.

13 Claims, 2 Drawing Sheets

OTHER PUBLICATIONS

WDM Optical IP Tag Switching with Packet–Rate Wavelength Conversion and Subcarrier Multiplex Addressing, D.J. Blumenthall, A. Carena, L. Rau, V. Curri, and S. Humphries, *Technical Digest of Optical Fiber Comm. 1999*, San Diego, CA, Feb. 21–26, 1999.

Design and Implementation of Ultra–Low Latency Optical Label Switching for Packet–Switched WDM Networks, B. Meagher, G.K. Chang, G. Ellinas, Y.M. Lin, W. Xin, T.F. Chen, X. Yang, A. Chowdhury, J. Young, S.J. Yoo, C. Lee, M.Z. Iqbal, T. Robe, H. Dai, Y.J. Chen, and W.I. Way, *Journal of Lightwave Technology*, vol. 18, No. 12, Dec. 2000.

Optical Flow Switching in the NGI, Eytan Modiano, Massachusetts Institute of Technology, Laboratory for Information and Decision Systems, Sep. 14, 1999.

Photonic Packet Switches: Architectures and Experimental Implementations, Daniel J. Blumenthal, *Member, IEEE*, Paul R. Prucnal, *Fellow, IEEE*, and Jon R. Sauer, *Proceedings of the IEEE*, vol. 82, No. 11, Nov. 1994.

SLOB: A Switch with Large Optical Buffers for Packet Switching, David K. Hunter, *Member, IEEE*, W. David Cornwell, Tim H. Gilfedder, Andre Franzen, Ivan Andonovic, *Senior Member, IEEE, Member, OSA, Journal of Lightwave Technology*, vol. 16, No. 10, Oct. 1998.

Approaches to Optical Internet Packet Switching, David K. Hunter and Ivan Andonovic, University of Strathclyde, U.K., *IEEE Communications Magazine*, Sep. 2000.

A Framework for Multiprotocol Label Switching, R. Callon, P. Doolan, N. Feldman, A. Fredette, G. Swallow, A. Viswanathan, *Internet Draft*, May 12, 1997.

Requirements for Traffic Engineering over MPLS, D. Awduche, J. Malcolm, J. Agogbua, M. O'Dell, J. McManus, *Network Working Group*, Sep. 1999.

Multiprotocol Label Switching Architecture, E. Rosen, A. Viswanathan, R. Callon, *Network Working Group*, Jan. 2001.

Multi–protocol Lambda Switching: Issues in Combining MPLS Traffic Engineering Control with Optical Cross–Connects, Debashis Basak, Daniel O. Awduche, John Drake, Yakov Rekhter, *Internet Draft*, Feb. 2000.

IP over Optical Networks: A Framework, Bala Rajagopalan, James Luciani, Daniel Awduche, Brad Cain, Bilel Jamoussi, Debanjan Saha, *Internet Draft*, Sep. 2001.

Generalized MPLS—Signaling Functional Description, Peter Ashwood–Smith, Ayan Banerjee, Lou Berger, Greg Bernstein, John Drake, Yanhe Fan, Kireeti Kompella, Eric Mannie, Johnathan P. Lang, Bala Rajagopalan, Yakov Rekhter, Debanjan Saha, Vishal Sharma, George Swallow, Z. Bo Tang, *Network Working Group*, Oct. 2000.

Some Comments on GMPLS and Optical Technologies, G. Bernstein, V. Sharma, *Network Working Group*, Nov. 2000.

Generalized Multiprotocol Label Switching: An Overview of Routing and Management Enhancements, Ayan Banerjee, John Drake, Johnathan P. Lang, Brad Turner, Kireeti Kompella, Yakov Rekhter, *IEEE Communications Magazine*, Jan. 2001.

PCT Search Report Aug. 22, 2001.

\* cited by examiner

LABELED OPTICAL BURST SWITCHING FOR IP-OVER-WDM INTEGRATION

REFERENCE TO RELATED APPLICATIONS

This application claims the filing date of Provisional Patent Application No. 60/269,005, filed on Feb. 15, 2001.

FIELD OF THE INVENTION

The current invention relates to the field of fiber-optic networks for telecommunications and data communications, in particular IP-over-WDM networking architectures.

BACKGROUND OF THE INVENTION

With recent advances in optical technologies, most notably wavelength division multiplexed (WDM) transmissions, the amount of raw bandwidth available on fiber optic links has increased by several orders of magnitude. Meanwhile, the ubiquity of the Internet Protocol (IP) has led to the much-touted IP-over-WDM as the core architecture for the next generation Optical Internet. This is due mostly to the expectation that such an architecture will streamline both network hardware and related software, and at the same time, result in a flexible and even future-proof infrastructure with virtually unlimited bandwidth. Undoubtedly, harnessing the bandwidth to effectively support IP and other high-layer protocols such as ATM in an efficient and scalable manner is vital to the continued growth of emergent optical networks.

There have been a number of proposed solutions to this problem. These include:

Wavelength Routing, which involves quasi-statically or dynamically establishing wavelength paths (circuits) for IP traffic; Multi-Protocol Lambda Switching, which extends the control framework of Multi-Protocol Label Switching (MPLS) to wavelength routing by treating each wavelength as a label; Optical Packet Switching: which utilizes the same concept as traditional packet switching, but the payload (data) is kept in the optical domain by using fiber-delay lines (FDL), while the packet header (control info) is processed either optically or converted back to an electronic signal then processed; Optical Label/Tag Switching, which uses a fixed length payload with a header containing a label/tag carried by sub-carrier multiplexing; and Terabit Burst Switching, in which variable length bursts (packets) are sent on a separate wavelength and set-up packets are electronically processed to make open-ended reservation (using explicit release or refresh packets). No offset time (or only an insignificant one) is used between a setup packet and its corresponding burst, which must be delayed using FDLs at intermediate nodes. Generalized MPLS or G-MPLS further extends MPLS to TDM (SONET) networks, but can only apply to wavelength-routed networks, TDM networks and electronic packet networks, not optical burst switched (OBS) networks.

These prior solutions all fall short in some way. Wavelength-Routing and Multi-Protocol Lambda Switching are not scalable as the number of wavelength paths that can be established is limited. They are also inefficient as the IP traffic is "bursty". Further, traffic aggregation/grooming at the edge, and reconfiguration of wavelength paths are complex. Optical packet-switching, Optical Label switching and Terabit Burst Switching methods all require FDLs, which are bulky and can only provide limited delay, and are uneconomic to implement.

Recently, optical burst switching (OBS) has been proposed as another solution to the problem of harnessing the bandwidth. OBS uses an optical switching paradigm to combine the best features of optical circuit switching and packet/cell switching. It provides improvements over Wavelength-Routing in terms of bandwidth efficiency and core scalability via the statistical multiplexing of bursts. In addition, by sending a control packet carrying routing information on a separate control wavelength (channel) with an offset time, i.e., a lead time before the transmission of the corresponding burst (or data), the use of FDLs can be eliminated. The OBS and its operation, as discussed in detail in C. Qiao and M. Yoo, "Optical Burst Switching (OBS)—A New Paradigm For An Optical Internet," Journal of High Speed Networks, 1999, Volume 8, Number 1, pp. 69–84, is hereby incorporated by reference as if fully set forth herein.

Furthermore, when compared to Optical Packet Switching where each packet has a fixed length and contains a header, OBS incurs a lower control (and processing) overhead as the length of a burst can be variable, and on average longer than that of a packet. In addition, under OBS a control packet and its corresponding burst can be much more loosely coupled in both space (by using separate control and data wavelengths) and in time (by using a nonzero offset time) than a header and its payload are in Optical Packet Switching, and hence, the requirements on processing control packets, and on synchronizing between bursts (as well as between a burst and its control packet) in OBS can be much less stringent than those on processing packet headers, and on synchronizing between packets (as well as between a packet's payload and its header) in optical packet switching.

Although OBS is a better solution than Wavelength-Routing, Multi-Protocol Lambda Protocol and Optical Packet Switching, it still requires a separate WDM layer (or so-called optical cloud) with separate mechanisms for addressing, routing, resource provisioning and so on. The advantage of integrating IP-over-WDM, as opposed to having an IP layer as well as a separate WDM layer, is that the integrated solution can reduce redundancies in software and hardware, increase efficiency, facilitate traffic engineering and network survivability, multi-vendor interoperability, interworking between heterogeneous networks, as well as having the potential for migration to optical packet-switched networks in the future.

It is, therefore, an object of the current invention to provide an integrated IP-over-WDM network solution to achieve the above advantages. It is a further object of the invention to achieve better bandwidth utilization when compared to previous optical circuit switching methods such as Wavelength Routing where wavelength paths are established using a two way process, by allowing for statistical sharing of each wavelength among flows of bursts that may otherwise consume several wavelengths. One further object is for the invention to support all optical data communications without requiring optical memory devices such as fiber delay lines, and offer interoperability with other MPLS-enabled networks.

SUMMARY OF THE INVENTION

The current invention teaches an integrated IP-over-WDM networking architecture utilizing a novel node structure called Labeled OBS or LOBS, and using Multi-Protocol Label Switching (MPLS) with LOBS specific extensions as the control platform and OBS as the data switching/transport mechanism.

A LOBS node is similar to a label-switched router (LSR) in MPLS terms and handles control packets (which contains a label as a part of the control information), and data bursts (each of which can be formed by assembling IP packets, Ethernet frames, ATM cells or other protocol data units going from a common ingress LOBS node to the same egress LOBS node). More specifically, the LOBS control plane sets up label switched OBS paths or LOBS paths for control packets and their corresponding data bursts. In such a LOBS network, both explicit routing (ER) and constraint-based routing (CBR) can be used to provision and engineer network resources. Modified/extended interior gateway protocols (IGP) can be used to disseminate resource/topology information for avoiding contentions for the same wavelength channel among bursts belonging to different LOBS paths. Finally, network availability concerns can be addressed using the emerging MPLS survivability framework (i.e., alternate/backup channels).

DETAILED DESCRIPTION OF THE INVENTION

Figure 1:
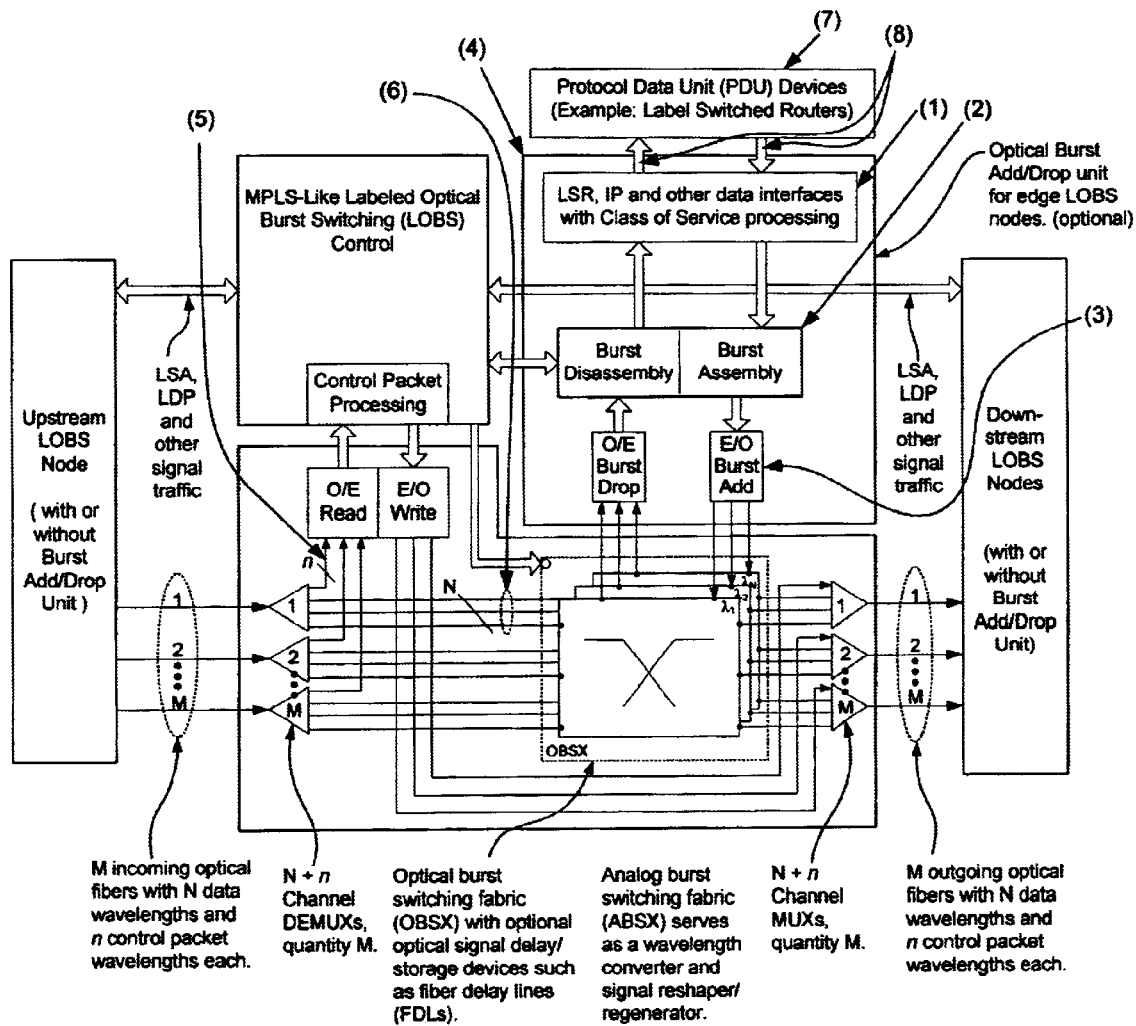
FIG. 1 depicts a Labeled Optical Burst Switching Node.

In the preferred embodiment of the invention, the backbone network will consist of LOBS nodes, including edge (both ingress and egress) LOBS nodes and core LOBS nodes. A LOBS node (showing both edge and core nodes) is shown in FIG. 1. Referring to FIG. 1, the access point (AP) interface (1), burst assembly/disassembly units (2) and LOBS data add/drop functions (3), are needed for edge LOBS nodes only. These are optional for core LOBS nodes. (In FIG. 1, (1), (2) and (3) are collectively grouped as being optional (4) for core LOBS.) FDLs and wavelength conversion capability are optional but preferred at LOBS nodes. LOBS nodes are interconnected with WDM links, each of which contains one or more control wavelengths (5), and one or more data wavelengths (6).

At the access point, PDU devices (7) will be attached to an edge LOBS node. PDUs from these devices are assembled into "bursts" at an ingress LOBS node, and then delivered, in an optical burst switched mode, to an egress LOBS node without going through an Optical/Electrical/Optical (O/E/O) conversion at intermediate (i.e., core) LOBS nodes. The egress LOBS node then disassembles each burst and forwards PDUs to appropriate PDU devices Turning to the AP interface between PDU devices and LOBS nodes (8): The traffic coming out of PDU devices are likely to be streams of packets (most probably IP packets) carrying various labels, where each label is associated with a specific class of service, and a specific LSP destined to a specific egress LSR attached to an egress LOBS node.

Figure 2:
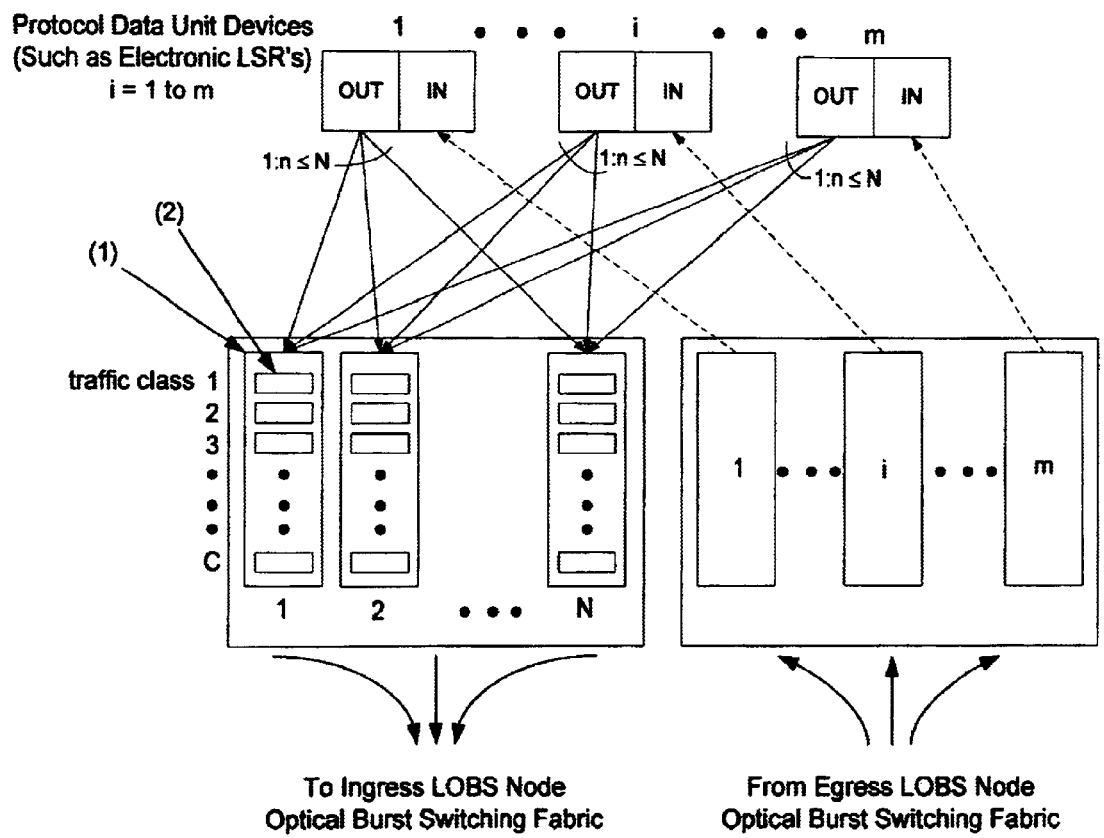
FIG. 2 depicts the Access Point interface between protocol data unit (PDU) devices (e.g., electronic LSR) and LOBS nodes.

In the preferred embodiment, the interface unit, see FIG. 2, will contain multiple burst assembly (BA) and burst disassembly (BD) buffers, (1) and (2) respectively, one for each egress LOBS node. Each BA buffer is, at least logically, divided into multiple queues (3), one for each Class of Service with specific delay, loss probability and other Quality of Service (QoS) parameters. A major function of the interface unit is to map PDUs to a corresponding BA buffer, where the PDUs are to be assembled into bursts that will be sent on one or more LOBS paths. Multiple LSPs may be mapped onto the same LOBS path (i.e., aggregated), provided that these LSPs are all destined to the same egress LOBS node (but possibly different egress PDU devices such as electronic LSRs attached to the egress LOBS node), and the LOBS path provides compatible (or better) services than required by these LSPs.

PDUs in a BA buffer are assembled into a burst (by adding guard bands at each end). Each PDU retains its MPLS label if any. A PDU's maximum delay budget is defined as the maximum time allowed for a PDU, in the absence of in traversal PDU loss, to traverse from an ingress LOBS node to an egress LOBS node. PDUs belonging to different classes of service may have different maximum delay budgets. A PDU will either be assembled into a burst or a following burst, so that the PDU is not fragmented. Assembly of a burst is considered to be complete if its length (in bits or bytes) exceeds a threshold, or if the remaining delay budget of a PDU in the burst reaches zero. The value of the threshold or timer is subject to further investigation. Other burst assembly algorithms are also possible.

Another function of the interface unit is to disassemble and distribute the bursts coming in on different LOBS paths. Burst disassembly is performed by the removal of the guard bands. After burst disassembly, PDUs packets (with their MPLS labels) if any are stored in appropriate BD buffers (which are structured similarly to BA buffers) and then forwarded to egress PDU devices such as electronic LSRs.

After a burst is assembled, an ingress LOBS node constructs a control packet that contains a MPLS header (i.e., 32 bits including a 20 bit label), a basic offset time, an extra offset time for QoS support, and the burst length. The label in the MPLS header corresponds to a LOBS path. (How the path is determined is described in further detail below). The control packet will then be transmitted over a control wavelength along the same physical route as that to be taken by the burst along the LOBS path. The corresponding burst is transmitted via the LOBS add/drop unit after the offset time specified by the control packet. Each control wavelength is terminated (i.e., the signals go through O/E/O conversions) at every LOBS node, where the control packet is processed electronically.

At an intermediate LOBS node, the bandwidth on an outgoing data wavelength is reserved (optionally, a FDL and/or a wavelength converter will also be reserved), for the corresponding burst, and the optical burst switching fabric inside the LOBS node is configured slightly before the offset time specified by the control packet (i.e., the expected burst arrival time).

The control packet may carry a new label as a result of performing the label push/pop/swap function as defined in MPLS. The offset time value is adjusted down to account for the processing delay the control packet experienced at this node. If the bandwidth reservation/switch configuration is successful, the control packet is transmitted to the next LOBS node. When a control packet arrives at an egress LOBS node, it is processed to configure the LOBS add/drop unit (among other tasks), and then discarded. The corresponding burst is received via the add/drop unit by the BD buffer. If, however, the bandwidth reservation/switch configuration at an intermediate LOBS node is not successful, the control packet will be dropped, and a negative acknowledgment (NAK) packet will be sent to the ingress LOBS node. A copy of the PDUs belonging to some Classes of Services will be kept at the ingress LOBS node, which, upon receiving the NAK for the burst containing one or more of these "lost" PDUs, will reassemble the lost PDUs into one or more bursts and retransmit the bursts. The copy of a PDU may be discarded after the maximum round trip time of a burst control packet within the LOBS network.

We now turn to a discussion on how path determination is performed. LOBS nodes will have IP addresses, and an Interior Gateway Protocol (IGP) such as OSPF (Open Shortest Path First) will be augmented/enhanced in order to disseminate the topology information. For example, new Link State Advertisements (LSA) packets will be used to carry information specific to LOBS such as burst profiles and the amount of allocated and free (i.e., available) FDLs at each node. The burst profile includes the average number and length of bursts that have successfully reserved bandwidth and FDLs, average (and extra) offset time used, average collision/dropping rate and so on. Based on the information obtained by the augmented IGP, a constraint based routing (CBR) or explicit routing (ER) algorithm will be used to determine the routes for LOBS paths.

The criteria (or QoS parameters) to be used by the CBR/ER algorithm include the expected burst dropping probability, and end-to-end latency. The former is dependent mainly on existing burst profiles, and the latter mainly on the total propagation delay between the node pair. One example of the algorithm is to distribute the load as evenly as possible among the links while trying to reduce the number of hops for each LOBS path.

Once the route for a LOBS path is determined by the CBR/ER algorithm, a constraint routing based label distribution protocol (CR-LDP) or an augmented RSVP protocol is used to establish the LOBS path. Basically, at an ingress LOBS node, the protocol assigns one or more labels (locally unique) to each class of bursts going to an egress LOBS node, and specifies the output link (and possibly the wavelength too when there is no wavelength conversion at the next LOBS node along the predetermined route). For a specific class of bursts between a node pair, a base offset time (at least its range) is determined, so is an extra offset time (which can be increased or decreased on a network wide basis).

At each intermediate LOBS node, the CR-LDP sets up a mapping between an incoming label on an incoming link to an (assigned) outgoing label and an outgoing link. At this time, wavelength channels may or may not be specified. When specifying wavelength channels, if the node doesn't have the wavelength conversion capability, the same wavelength as the one used by the incoming burst will be used on the output link; otherwise, a different wavelength may be used instead. If wavelength channels are not specified by the CR-LDP, the control packet must contain the wavelength channel information and at each intermediate node, the output channel selected must be the same as the input channel if the node does not have wavelength conversion capability, but can be different otherwise. At an egress LOBS node, an incoming label is mapped to a BD buffer corresponding to the class of services the label (or LOBS path) is associated with. In addition, when more than one electronic LSPs with equivalent class of services coming out of electronic LSR's and going to the same egress LOBS node are aggregated onto a LOBS path belonging to that class of service at an ingress LOBS node, the LOBS path will be disaggregated at the common egress LOBS node.

LOBS network survivability issues are addressed based on extensions to several existing schemes for routing primary and backup LSPs. As in MPLS, primary and backup LOBS paths are established. Since OBS allows for statistical multiplexing between bursts, this level of sharing is expected to yield even better efficiency in LOBS networks than in wavelength-routed networks with similar approaches. For example, new protection schemes such as 1+n and n:1 may become possible, whereby a primary LOBS path is protected by n backup LOBS paths, each to carry a fraction (e.g. 1/n th) of the working traffic (bursts).

More specifically, one may restore a primary LOBS path by sending some bursts along the same backup route on different wavelengths or even along different backup routes. In such cases, the complexity associated with reordering bursts at the egress LOBS node may increase (note that reordering bursts may be necessary even when 1:1 protection is used since a backup LOBS path may be shorter than its corresponding primary LOBS path). Additionally, idle resources for backup routes can also be used to carry lower-priority preemptable traffic (i.e. bursts), further improving network-level utilization. Compared to MPL(ambda)S or wavelength-routed networks, restoration in LOBS networks can be faster because rerouted burst can be sent without having to wait for acknowledgement that the wavelength switches/routers along the predetermined backup LSP have been configured properly.

As a solution to the problem of fault detection and localization, some form of electronic framing/monitoring can be used on embedded LOBS control channels (wavelengths), since these are electronically terminated at each node. Also, monitoring can be done at each LOBS node (i.e. on a hop-by-hop basis) without complex protocols of network level significance since LOBS nodes will simply detect and localize fault events while MPLS signaling will restore service. LOBS nodes can also adopt emerging techniques such as per link/channel monitoring of optical power levels received/transmitted, optical signal-to-noise ratios and so on to detect and localize faults, eliminating the need for any electronic frame monitoring altogether.

In comparing LOBS with prior methods, we can see that LOBS differs from MPL(ambda)S in that in MPL(ambda)S, a label is a wavelength, that is, only one label is mapped to a wavelength, and this mapping lasts for the duration of the label switched path (LSP). Also, data on two or more LSPs (each using a wavelength) cannot be groomed/aggregated onto one LSP (using one wavelength) due to the current lack of wavelength merging techniques. Finally, the underlying optical switch fabric at each node is a cross-connect (or wavelength router). However, under LOBS, multiple labels can be mapped to a wavelength to achieve statistical sharing of the bandwidth of a wavelength among bursts belonging to different LOBS pathss. At each ingress LOBS node, a LOBS path can be mapped to different wavelengths (regardless of any wavelength conversion capability). With wavelength conversion at an intermediate node, a label (or a LOBS path) may be mapped to different wavelengths at different times as well.

Although the present invention and its advantages have been described in the foregoing detailed description and illustrated in the accompanying figures, it will be understood by those skilled in the art that the invention is not limited to the embodiment(s) disclosed but is capable of numerous rearrangements, substitutions and modifications without departing from the spirit and scope of the invention as defined by the appended claims.

Some foreseeable such substitutions pertain to the means of processing the Labeled Optical Burst Switching Control Packet wherein one or more of the steps within the means for processing the control packet, (such as reading the control packet, logically processing the information read by performing some algorithm or data lookup or other means as a result of the information read for the purposes of setting up a path (i.e. a bandwidth reservation), and subsequently forwarding of this modified or unmodified control packet); may be done in-part or in-whole by optical, or quantum computing, or other means rather than by electronic means. In general, the same economic benefits are gained in that the expense of implementing such optical or quantum computing or other means, is limited to the few control packet signal channels rather than being required on all of the signal channels as is done in the prior art such as is found in Optical Packet Switching wherein the packet headers on every signal channel are read and process either electronically, optically or by some combination of both.

What is claimed is:

1. A method for transmitting data over an optical network, comprising the steps of:

transmitting a first protocol data unit (PDU) to an ingress labeled optical burst switching (LOBS) node, said ingress LOBS node having a Burst Assembly unit and a control packet processing unit, and is connected to at least one other LOBS node, passing said first PDU, including its label, if any, to said Burst Assembly unit, said first PDU containing addressing information identifying an egress LOBS node, optionally passing at least one additional PDU going to the same egress LOBS node as the first PDU to said Burst Assembly unit, continuing to pass additional PDUs going to the same egress LOBS node as prior PDUs to said Burst Assembly unit until a pre-set threshold is met, said Burst Assembly unit assembling an optical burst from the PDUs passed to it, said control packet processing unit of the ingress LOBS node constructing a labeled optical burst switching control packet, said control packet containing at least addressing information, and the initial delay of the optical burst with respect to the control packet, and, but not limited to, optionally containing class of service and quality of service parameters, sending the labeled optical burst switching control packet on a designated control wavelength to a second LOBS node, said second LOBS node either being a node intermediate to the egress LOBS node or the egress LOBS node, processing the labeled optical burst switching control packet at said node intermediate to the egress LOBS node in order to set up a path using a data wavelength from the ingress LOBS node to the egress LOBS node, or at the egress node in order to drop the burst at the burst dis-assembly unit, sending the optical data burst to the egress node along the pre-set path on a data wavelength in an optical burst switched mode without converting the optical data burst to an electrical signal at intermediate LOBS nodes, and without requiring burst delay devices such as FDLs and without requiring wavelength conversion devices, the egress LOBS node receiving the optical data burst, said egress node having a burst dis-assembly unit, passing the optical data burst to said burst dis-assembly unit, and the burst dis-assembly unit converting the optical data burst to PDUs.

2. A method for transmitting data over an optical network according to claim 1, in which the optical burst switching control packet, comprises a field for Label as defined in the Multi-Protocol Label Switching protocol, at least one other field as defined in said protocol, and at least one LOBS specific field selected from the group consisting of Burst length, basic offset time, extra offset time, control packet arrival time, control packet departure time, error detecting/correcting code, ingress LOBS node address and egress LOBS node address.

3. A network for the transmission of data, comprising:

means for transmitting a first protocol data unit (PDU) to an ingress labeled optical burst switching (LOBS) node, said ingress LOBS node having a Burst Assembly unit and a control packet processing unit, and is connected to at least one other LOBS node, means for passing said first PDU, including its label, if any, to said Burst Assembly unit of said first PDU containing addressing information identifying an egress LOBS node, means for optionally passing at least one additional PDU going to the same egress LOBS node as the first PDU to said Burst Assembly unit, means for continuing to pass additional PDUs going to the same egress LOBS node as prior PDUs to said Burst Assembly unit until a pre-set threshold is met, means for said Burst Assembly unit assembling an optical burst from the PDUs passed to it, means for said control packet processing unit of the ingress LOBS node constructing a labeled optical burst switching control packet, said control packet containing at least addressing information, and the initial delay of the optical burst with respect to the control packet, and the initial delay of the optical burst with respect to the control packet, and, but not limited to, optionally containing class of service and quality of service parameters, means for sending the labeled optical burst switching control packet on a designated control wavelength to a second LOBS node, said LOBS node either being a LOBS node intermediate to the egress LOBS node or the egress LOBS node, means for processing the labeled optical burst switching control packet at said LOBS node intermediate to the egress LOBS node in order to set up a path using a data wavelength from the ingress LOBS node to the egress LOBS node, or at the egress node in order to drop the burst at the burst dis-assembly unit, means for sending the optical data burst to the egress node along the pre-set path on a data wavelength in an optical burst switched mode without converting the optical data burst to an electrical signal at intermediate LOBS nodes, and without requiring burst delay devices such as FDLs and without requiring wavelength conversion devices, means for the egress LOBS node receiving the optical data burst, said egress node having a burst dis-assembly unit, means for passing the optical data burst to said burst dis-assembly unit, and means for the burst dis-assembly unit converting the optical data burst to PDUs.

4. A network according to claim 3, in which the intermediate Labeled Optical Burst Switching Node comprises:

a Wavelength-Division Multiplexed Optical Burst Switch comprising an Optical Burst Switching Fabric and its controller, an input interface and an output interface; and a control packet processing unit connected to the Wavelength-Division Multiplexed Optical Burst Switch, said processing unit utilizing as the control platform Multi-Protocol Label Switching in conjunction with LOBS specific extensions.

5. A network according to claim 3, in which the ingress Labeled Optical Burst Switching Node comprises:
- an Access Point interface connecting the ingress Labeled Optical Burst Switching Node to PDU devices,
- a Burst assembly unit,
- a Wavelength-Division Multiplexed Optical Burst Switch comprising an Optical Burst Switching Fabric and its controller, an input interface and an output interface; and
- a control packet processing unit connected to the Wavelength-Division Multiplexed Optical Burst Switch, said processing unit utilizing as the control platform Multi-Protocol Label Switching in conjunction with LOBS specific extensions.

6. A network according to claim 3, in which the egress Labeled Optical Burst Switching Node comprises:
- an Access Point interface connecting the Labeled Optical Burst Switching Node to PDU devices,
- a Burst dis-assembly unit,
- a Wavelength-Division Multiplexed Optical Burst Switch comprising an Optical Burst Switching Fabric and its controller, an input interface and an output interface; and
- a control packet processing unit connected to the Wavelength-Division Multiplexed Optical Burst Switch, said processing unit utilizing as the control platform Multi-Protocol Label Switching in conjunction with LOBS specific extensions.

7. A network for the transmission of data according to claim 3, in which protocol data units or data packets from PDU devices such as electronic label switching routers are assembled into optical bursts at an ingress LOBS node, and then delivered, in an optical burst switched mode, to an egress LOBS node, without going through an Optical/Electrical/Optical conversion at intermediate LOBS nodes.

8. A network for the transmission of data according to claim 3, in which packets going to the same egress Labeled Optical Burst Switching node are assembled into at least one burst according to the packet's Class of Service.

9. A network for the transmission of data according to claim 3, in which for one or more Classes of Service, the assembly time of a burst is limited according to the minimum value of the maximum delay budget of the packets assembled in the burst.

10. A network for the transmission of data according to claim 3, in which for one or more Classes of Service, the assembly of a burst is completed once the length of the burst as measured in bits, bytes or transmission time, exceeds a threshold.

11. A network for the transmission of data according to claim 3, in which burst profile information is distributed pertaining to each link in a Labeled Optical Burst Switched Network to establish one or more LOBS paths according to the distributed burst profile information.

12. A network for the transmission of data according to claim 3, wherein at least one backup LOBS path for at least one primary path is established, and at least one copy of at least one lost data burst or portion thereof is sent via at least one such backup LOBS path.

13. A network for the transmission of data according to claim 3, in which a method for the detection and localization of faults in LOBS networks comprising electronic monitoring on designated LOBS control channels is implemented.

* * * * *